United States Patent Office 2,915,476
Patented Dec. 1, 1959

2,915,476

PROCESS FOR BREAKING EMULSIONS OF THE OIL-IN-WATER TYPE USING POLYMERIC QUATERNARY AMMONIUM SALTS

Kwan-Ting Shen, Brentwood, Mo., assignor to Petrolite Corporation, Wilmington, Del., a corporation of Delaware No Drawing. Application December 8, 1952
Serial No. 324,813

16 Claims. (Cl. 252—341)

This invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "blux oil" in steam condensate produced in the catalytic dehydrogenation of butylene to produce butadiene; styrene-in-water emulsions, in synthetic rubber plants; synthetic latex-in-water emulsions, in plants producing co-polymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficulty recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsions paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrences.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The reagents employed in the present process consist of certain polymerized N-substituted polyvinyl heterocyclics. Said polymerized N-substituted polyvinyl heterocyclics have utility in various arts. Their use in resolving emulsions of the oil-in-water type seems to be practical and economical in light of a newly discovered method by which such products can be made efficiently and comparatively inexpensively.

More specifically, the present invention is concerned with a process for breaking oil-in-water emulsions composed of an oil dispersed in a non-oily continuous phase in which the dispersed phase is not greater than 20% characterized by subjecting the emulsion to the action of a demulsifier including hydrophile synthetic products; said hydrophile synthetic products being polymeric quaternary ammonium salts; said salts being prepared by a method involving nitrogen-containing vinyl-substituted heterocyclic compounds selected from the class consisting of vinyl pyridine, vinyl pyrazine, vinyl piperidine, vinyl quinoline, alkylated vinyl pyridine, alkylated pyrazine, alkylated vinyl piperidine, and alkylated vinyl quinoline; and said process involving reaction between the aforementioned vinyl heterocyclic compounds and a monocarboxy acid having a reactive halogen; said reactants being combined in substantially a mole-for-mole ratio; said process involving at various stages the following type reactions: salt formation, polymerization, quaternization and decarboxylation. In the case of piperidine 2 moles of a halogen acid may be used.

As previously stated, the availability of such polymerized N-substituted polyvinyl heterocyclic at a cost which permits economical use in resolution of oil-in-water emulsions, and particularly petroleum emulsions of the oil-in-water type depends on a new method of manufacture which is described in the copending application, Serial No. 324,812, filed December 8, 1952, now Patent No. 2,771,462, dated November 20, 1956, which states as follows:

It is well known to those skilled in the art that vinyl substituted heterocyclics, such as vinyl pyridine, vinyl pyrazine, vinyl piperidine, vinyl quinoline, and the like, can be caused to polymerize under the influence of heat and catalysts to produce chain polymers of the type

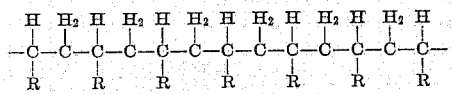

wherein R is a cyclic nitrogen-containing structure such as pyridine, pyrazine, piperidine, quinoline, etc.

It is also well known to those skilled in the art that polymers of the aforementioned type may be reacted with halogen-containing compounds such as ethyl bromide to introduce substituents on the ring nitrogen, thus forming either a tertiary amino group or a quaternary amino compound. These chain polymers with a plurality of nitrogen-containing groups are useful for a wide variety of purposes, which will be discussed subsequently. In the preparation of these materials as outlined above a two-step process is usually required. First, the vinyl heterocyclic must be polymerized, and then the modification of the amino group must be performed. In some cases the amino modification can be carried out first and then the polymerization performed, but in either case two separate steps are involved.

The amine modification step involves the use of halogenated compounds that are relatively expensive and results in the elimination of halogen acid which sometimes introduces corrosion problems in the equipment. The polymerization step must be carried out under careful control in the presence of suitable catalysts. Both these steps are expensive and time-consuming.

For purpose of convenience what is said hereinafter in regard to the reagents employed in manufacturing the polymeric heterocyclic compounds and the raw materials, is substantially as it appears in the text of the aforementioned co-pending application, Serial No. 324,812, filed December 8, 1952.

For convenience, what is said subsequently will be divided into five parts:

Part 1 is concerned with a description of the nitrogen-containing heterocyclic vinyl-substituted compounds that may be used as one of the initial reactants in the practice of the present invention;

Part 2 is a description of the alpha-halogen carboxylic acids and their equivalents which may be used to perform the described modification and polymerization of the previously specified vinyl compounds;

Part 3 is a description of the new and novel method employed in the preparation of the hereindescribed polymers;

Part 4 is concerned with a discussion of the possible mechanism of the reaction involved in the herein described new and novel method of preparation of these polymers; and Part 5 is concerned with the use of said polymerized heterocyclic compounds for the resolution of oil-in-water emulsions and particularly petroleum emulsions of the oil-in-water type.

PART 1

One type of initial reactant which may be used in the preparation of the herein described compounds has been characterized previously for purposes of convenience as a nitrogen-containing vinyl-substituted heterocyclic. By "nitrogen-containing vinyl-substituted heterocyclic" is meant any chemical compound which has as a part of its structure a ring system containing nitrogen as a part of the cyclic system, and further has as a substituent upon this cyclic unit a vinyl or sometimes substituted vinyl group. This general specification includes a diverse group of materials. For instance, the heterocyclic ring may be an essentially aromatic ring such as pyridine or pyrazine, a fused ring system such as quinoline, or a non-aromatic ring such as piperidine. The essential structural element is the presence of one or more nitrogen atoms in the cyclic structure which are capable of entering into reaction with halogen atoms from the halogenated carboxylic acids to produce substituted nitrogen atoms or quaternary compounds. Further, there should be as a substituent on the ring a vinyl or substituted vinyl group capable of inducing in the molecule a tendency toward polymerization by the usual vinyl polymerization mechanisms.

For specific information on the preparation of vinyl pyridines reference is made to U.S. Patent No. 2,512,660, dated June 27, 1950, to Mahan, or U.S. Patent No. 2,556,845, dated June 12, 1951, to Kauffman. The preparation of these compounds has been repeatedly discussed in the chemical literature and further reference is made to the articles by Einhorn and Lehnkering; Ann. 246,172 (1888) and by Methner; Ber. 27, 2689 (1894) or to the article by Iddles et al.: JACS 59, 1945–6 (1937). For the preparation of vinyl piperidines reference is made to the previously cited article by Iddles, or to Landenburg; Ber. 22, 2487 (1889). The preparation of vinyl quinolines is described in an article by G. B. Bachman, et al.: JACS 70, 2381–4 (1948). L. J. Kitchen et al., in an article in JACS 69, 854 (1947), and in an article in JACS 73, 1838 (1951) describes the preparation of the vinyl pyrazines.

The following specific examples of compounds which may be employed for the purpose previously specified in this section are cited by way of illustration and are not to be construed as limiting the scope of the invention.

*Example 1a*

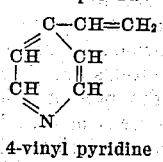

4-vinyl pyridine

*Example 2a*

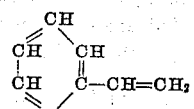

2-vinyl pyridine

*Example 3a*

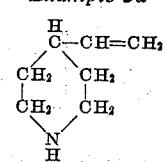

4-vinyl piperidine

*Example 4a*

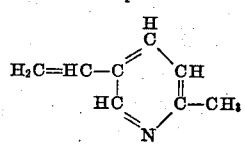

2-methyl-5-vinyl pyridine

*Example 5a*

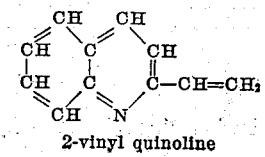

2-vinyl quinoline

*Example 6a*

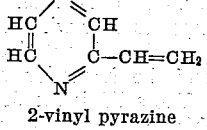

2-vinyl pyrazine

The preceding six examples illustrate a number of suitable compounds which are particularly suited for use in the present invention. However, other well known compounds can be substituted for these particular ones without departing from the spirit of the invention.

PART 2

In the utilization of the herein contemplated method of preparation of the previously described polymers, nitrogen-containing vinyl-substituted heterocyclics are reacted with alpha-halogen carboxylic acids of the general type

where R is a member of the class consisting of hydrogen atoms and hydrocarbon radicals such as methyl, ethyl, and other lower straight chain or branched radicals, and R' is selected from the class consisting of hydrogen, chlorine, fluorine, bromine and iodine, with the proviso that there must be at least one occurrence of the halogen atom. Trichloroacetic acid may be used in which case, of course, R and both occurrences of R' represent chlorine. Other comparable halogen acids, such as tribromoacetic acid, can be used. Any halogenated acid can be employed provided the halogen atom is labile. Such lability is almost invariably due to 1,2 unsaturation and although such unsaturation may have some slight effect beyond the alpha carbon atom, yet for obvious reasons I prefer to use the alpha halogenated acid rather than the beta halogenated acid, or the like. However, in other acids, halogen attached to some atom substantially removed from the carboxyl radical might be reactive due to the effect of a nearby unsaturated group. Specific examples of the compounds which I prefer to employ are alpha chloroacetic acid, and particularly alpha-halogen carboxylic acids having not over 6 carbon atoms. Other suitable reactants some of which contain over 6 carbon atoms, include alpha chloropropionic acid, alpha-chloro-butyric acid, bromoacetic acid, dichloroacetic acid, alpha-chlorostearic acid, alpha-chloro oleic acid, alpha-bromo stearic acid, and alpha-bromo oleic acid.

It is my preference to use the chloro derivatives since they are commercially available. However, the bromo, iodo, and fluoro derivatives may be used if desired. The essential requirements are that the carboxylic acid be substituted with at least one reactive halogen and preferably on the alpha carbon atom and that the hydrocarbon residue be of such a nature that steric hindrance does not block the reactivity of the halogen.

Attention is again directed to the fact that in the claims reference to substantially mole-for-mole ratio is intended to include also the exceptional instance of piperidine which, as a matter of fact, can react with 2 moles of the halogenated acid instead of a single mole. If one attempted more specific cognizance in the hereto appended claims further complication would be added which would not be worth while. The use of two such moles of acid does not depart from the spirit of the invention. Likewise, as has been pointed out, substantially less than a mole of acid can be employed and part of the nitrogen groups in the initial polymer be left unconverted.

PART 3

The employment of the new and novel method for the preparation of the above mentioned polymers is comparatively simple. It involves nothing more than adding the two types of reactants in substantially stoichiometric proportions. The reaction ordinarily starts readily at room temperature or with only the most moderate heating. An exothermic reaction ensues with the evolution of gas and the formation of a light colored voluminous solid. The solid is the desired end product and is readily soluble in water. The procedure may be illustrated by the following examples:

*Example 1b*

One-half gram mole (52.5 grams) of 4-vinyl pyridine is added dropwise to one-half gram mole (47.3 grams) of finely pulverized chloroacetic acid in an open reactor, equipped with a stirring device. The temperature of the reactants, initially, was about 23° C. As the 4-vinyl pyridine is added to the acid the temperature of the mixture rises and soon a vigorous reaction ensues with the evolution of a gas. As the polymerization proceeds to the point where a solid material is formed, the escaping gas causes the viscous liquid to foam and a voluminous, fluffy, fragile solid results. If a portion of this solid is placed in water it readily dissolves to produce a clear, red solution.

As further examples of reactant combinations which may be used, the following list is included. Since the exact reaction mechanism and the degree of polymerization is incompletely known, these materials are best characterized by a designation of their reactive components.

*Example 2b*

105 grams of the heterocyclic compound described as Example 1a are reacted with 153 grams of alpha-bromopropionic acid in the same manner as described in Example 1b, preceding.

*Example 3b*

105 grams of the heterocyclic compound described as Example 2a are reacted with 94.5 grams of chloroacetic acid in the same manner as described in Example 1b, preceding.

*Example 4b*

111 grams of the heterocyclic compound described as Example 3a are reacted with 163.4 grams of trichloroacetic acid in the same manner as described in Example 1b, preceding.

*Example 5b*

119 grams of the heterocyclic compound described as Example 4a are reacted with 94.5 grams of chloroacetic acid in the same manner as described in Example 1b, preceding.

*Example 6b*

155 grams of the heterocyclic compound described as Example 5a are reacted with 139 grams of bromoacetic acid in the same manner as described in Example 1b, preceding.

*Example 7b*

105 grams of the heterocycle compound described as Example 2a are reacted with 114 grams of trifluoroacetic acid in the same manner as described in Example 1b, preceding.

I prefer to use heterocyclic compounds which have only one ring and particularly pyridine and pyridine derivatives as, for example, monoalkylated or dialkylated vinyl pyridine. My preference is that the alkyl group be a low molal group having not over 6 carbon atoms and generally 1 or 2 carbon atoms such as a methyl or ethyl group. If alkylated, it is my preference that the vinyl pyridine be monoalkylated, such as monomethylated or monoethylated vinyl pyridine.

PART 4

From a consideration of the known properties and reactions of the vinyl heterocyclics herein previously described, it is believed that the products produced from the method herein described are of the type:

$$-\overset{H}{\underset{R}{C}}-\overset{H_2}{\underset{}{C}}-\overset{H}{\underset{R}{C}}-(\overset{H_2}{\underset{}{C}}-\overset{H}{\underset{}{C}})_n-\overset{H}{\underset{R}{C}}-\overset{H_2}{\underset{}{C}}-\overset{H}{\underset{R}{C}}-\overset{H_2}{\underset{R}{C}}-\overset{H}{\underset{}{C}}-$$

with terminal ending $CH_3$ or $CH_2R$ although ring compounds also may be formed, where R is a nitrogen-containing heterocyclic derived from the compounds described in Part 1, and $n$ is a numeral of indeterminate size, probably less than 20. Sometimes in an idealized formula such as the above an effort is made to speculate as to the terminal groups. Under such circumstances the terminal groups might be $CH_3$ or $CH_2R$. However, ring compounds cannot be ruled out and if formed, then it would be inappropriate to show terminal radicals with the valences completely satisfied.

It is further believed that the nitrogen-containing heterocyclic residue designated by R above has within its structure a grouping selected from the class consisting of $$\left[ -\overset{R''}{\underset{}{N}}- \right]^+ [R']^- \text{ and } \left[ -\overset{R''}{\underset{}{N}}= \right]^+ [R']^-$$

where R'' is a hydrocarbon residue of one less carbon than the halocarboxylic employed, and R' is a halogen.

Although the present invention is concerned with polymeric quaternary ammonium compounds it is obvious, when a polymeric compound of the kind described is reacted with chloroacetic acid or the like, that the majority of the ring structures are probably converted into the quaternary salt but some may not be, i.e., they remain unaltered or perhaps are converted to a tertiary group.

In the hereto appended claims reference to quaternization is not limited necessarily to complete quaternization, but may include instances where a significant majority of nitrogen groups have been so converted.

On the basis of the present evidence it is believed that the reaction proceeds as will be described hereinafter. For purposes of clarity and simplicity the reactants of Example 1b will be used. This is not to be construed as limiting the scope of the method and it should be noted that analogous mechanism diagrams can be written for any of the other indicated reactant combinations.

When the nitrogen-containing vinyl heterocyclic is added to the acid the first step is believed to be salt formation between the acid and the nitrogen-containing group, thus:

$$R-\underset{R'}{\overset{R'}{C}}-\overset{O}{\overset{\|}{C}}OH + N\diagup \longrightarrow \left[R-\underset{R'}{\overset{R'}{C}}-\overset{O}{\overset{\|}{C}}O\right]^- \left[HN\diagup\right]^+$$

acid    base             salt

This reaction is known to be exothermic and the heat evolved is then believed to initiate the polymerization of the salt through the vinyl grouping, thus:

This polymerization through the ethylenic (vinyl)

linkage is known also to be highly exothermic. It should be noted now that in the formation of the salt previously described the alpha halogen atom is brought into direct proximity with the nitrogen-containing group. On the basis of evidence to be cited hereinafter it is believed that the heat from the vinyl polymerization causes a reaction between the halogen and the nitrogen containing group, thus:

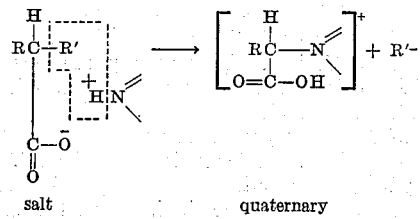

salt    quaternary

This quaternary salt is then decarboxylated by the heat of reaction to give:

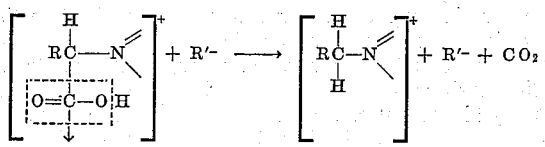

The overall course of the reaction is, then, postulated as:

(a) Salt formation
(b) Polymerization
(c) Quaternization
(d) Decarboxylation

There is ample experimental evidence to support this postulate. Salt formation between nitrogen-containing groups and acids is well substantiated. It has been clearly demonstrated also that polymerization of substituted vinyl compounds takes place through the ethylenic linkages in the manner described and that this reaction is highly exothermic. Quaternization of nitrogen-containing groups by the reaction with halogens is well known, also. Further in the specific reaction described above, if silver nitrate is added to the water solution of the final polymer, a precipitate of the silver halide will form instantly. This clearly shows that the halogen is in the form of a negative ion.

If the gas evolved in the previously described reaction is passed through an aqueous solution of barium hydroxide, a white precipitate is formed which, when washed, dried, and treated with hydrochloric acid, evolves carbon dioxide. This is strong evidence in favor of the postulated decarboxylation.

The final product of the method of this invention is believed to be a polymer of indeterminate size, perhaps in some instances as much as 100 units or more, and in other instances perhaps less than 20 units. Each unit, of course, has a substituted nitrogen atom in the heterocyclic ring. To the extent that choice is possible polymers having less than 20 units are preferred.

It is possible that in addition to producing products which have been obtained by other procedures I do obtain, in part, entirely new chemical compounds by using the described method. If such compounds are obtained I know of no procedure which will isolate them from the cogeneric mixture. Furthermore, it appears that following the method described one would expect to obtain, and perhaps does obtain, to some degree an alkyl halide such as methylchloride. In any event and to further indicate the possible nature of the reaction and to shed further light on the same, attention is directed to the reaction between pyridine and chloroacetic acid with the formation of pyridine betaine hydrochloride which decomposes at 202°–205° C., giving carbon dioxide, methyl chloride, and pyridine.

PART 5

The demulsifying agents herein described for resolution of oil-in-water type emulsions may be used alone or in combination with other products which also are effective for resolution of oil-in-water emulsions. For example, I can use polymerized quaternary heterocyclic compounds of the kind previously described plus a multipolar, substantially un-ionized hydrophile colloid, plus an electrolyte of the kind hereinafter described. Such hydrophile colloids have been claimed for use in resolving naturally-occurring oil-in-water-class crude petroleum emulsions by Blair and Rogers, U.S. Patent No. 2,159,-313, issued May 23, 1939, which states:

"We have discovered that these unique emulsions having the peculiar characteristics above referred to, can be rapidly separated into their component parts by treating the same with a mineral concentration of a hydrophile colloid of the kind hereinafter described. The effective hydrophile colloids intended to be used as the treating agent in our process, are those which give rise only to very small electrical effects when adsorbed at interfaces. In general, they are either the weakly ionized, amphoteric or unionized hydrophile colloids, and are further characterized by the fact that they contain a multiplicity of polar groups, such as —COOH, —COOR, R—O—R, —OH, —NH$_2$, —NRH, NR$_2$, —CO—NH, etc. where R is a univalent organic radical. It may happen that all the polar groups which are present in a hydrophile colloid are of the same kind, or they may be of substantially different kinds, or they may be of several varieties which are generically related to each other. Such hydrophile colloids are characterized by the fact that the polar groups are not segregated at a particular point, but are distributed more or less uniformly throughout the molecule, so that their solution or sol contains a body having what appears to be a more or less uniformly hydrated surface, although the chemical structure of the molecule indicates that the hydrated zones must be interrupted or alternated by non-hydrated zones or groups of non-polar or hydrophobe character.

"This feature of distributed hydration along with the concomitant property of distributed hydrophobe characteristics, distinguishes these materials from other hydrophile colloids, such as soaps, the molecules of which are considered as being made up of one definitely polar hydrated end, and one definitely non-polar, non-hydrated end. Inasmuch as these hydrophile colloids contain more than one polar group, they may be referred to as 'multipolar' and may be defined as the multipolar, substantially un-ionized type of hydrophile colloid. The expression 'substantially un-ionized,' as herein used, is intended to include the previously described hydrophile colloids which give rise to mineral electrical effects.

"The colloidal dispersions of these hydrophile colloids are relatively non-sensitive to electrolytes, and they often form gels or very viscous, aqueous dispersions. Materials such as soaps, highly ionized dyes, and other relatively strong colloidal electrolytes, high molecular weight organic sulfates and sulfonates, are not included in this classification. Examples of materials having the properties which make them suitable for use as a demulsifying agent for breaking the peculiar oil-in-water type emulsion previously described are: glue, gelatin, casein, starch, albumin, tannin, dextrin, methyl cellulose, water-soluble ethyl cellulose, Prosopis julifiora exudate, gum arabic, many other water-dispersible gums water-dispersible urea-aldehyde resins, etc. In some instances, a mixture of two or more of such materials or colloids may be more effective than one alone. It is recognized that some of these products, such as starch, glue, or the like, produce degradation products which are similar in colloidal nature to their parent material. Obviously, such degradation products could be used with equal effectiveness. In order to designate only the desired type of hydrophile colloid and to exclude the unsuitable type, we will refer to the type employed as being substantially un-ionized. The expression 'substantially un-ionized' is meant to include the type which is un-ionized or weakly ionized or amphoteric." (Page 1, col. 2, line 23, page 2, col. 1, line 44.)

I specifically incorporate into the present specification the examples of such colloid set out therein, including glue and starch.

Certain electrolytes have been claimed for use in resolving naturally-occurring oil-in-water class crude petroleum emulsions by Blair U.S. Patent No. 2,159,312, issued May 23, 1939, from which the following is quoted:

"Electrolytes which have been found to be the most effective when used with the hydrophile colloids described above are those containing highly charged or relatively highly adsorbable cations, and may be either inorganic or organic compounds. In some cases, compounds containing cations such as Na+ or H+, bearing only one charge, when added to the emulsion described, along with a hydrophile colloid, have been found to give faster and cleaner separation of phases than can be obtained with a hydrophile colloid alone. However, among inorganic electrolytes, it has been found that compounds containing divalent, trivalent, tetravalent or higher valence cations, usually are the most effective. Organic compounds containing a large highly adsorbable cation, usually are quite effective in this mixture, regardless of valence."

"Examples of electrolytes which I have found to be suitable for admixture with a hydrophile colloid of the kind previously described are: NaCl, KCl, HCl, $H_2SO_4$, $HNO_3$, $CaCl_2$, $MgCl_2$, $Ca(NO_3)_2$, $FeCl_3$, $Th(NO_3)_4$, $Ce(SO_4)_2$, $Mg(NO_3)_2$, $MgSO_4$, $Al_2(SO_4)_3$, $AlCl_3$, $FeSO_4$, $Fe(NO_3)_3$, methylene blue, fuchsin, many other basic dyes, perlargonidin chloride, cetyl pyridinium bromide, toluidine hydrochloride, diphenyl guanidine hydrochloride, benzyl pyridinium chloride, many other water-soluble salts of strong or relatively strong organic bases of moderately high molecular weight, etc. Because of their low cost and availability, salts of alkaline earth metals and of iron, such as $CaCl_2$, $MgCl_2$, $MgSO_4$, $BaCl_2$, and $FeSO_4$, are usually employed." (Page 2, col. 1, line 56-col. 2, line 14.)

I specifically incorporate into the present specification all the examples of such electrolyte set out therein, including salts of alkaline earth metals, such as calcium chloride.

So far as my experience goes, the proportion of hydrophile colloid, as compared with that of polymeric quaternary heterocyclic compound is more important in determining optimum effectiveness on any given emulsion, than is the proportion of electrolyte employed. In at least some instances, the latter appears to be most useful in determining the physical characteristics of the finished mixture, i.e., desirable fluidity may be achieved by incorporating such electrolyte.

If desired, more than one member of each of my three classes of ingredients may be present in my reagents.

Because of the variability of oil-in-water-class emulsions on which my reagents are effective, it is impossible to give a single proportion of ingredients which will be most effective on all. As a generalization, I can state that a minimum of 10% of each class of ingredient is desirable, in the active matter present in my final ternary mixture of polymeric quaternary heterocyclic compound, colloid, and electrolyte. In other words, not more than 80% of the active matter of my reagent should consist of any one class of ingredient. In general, also, I have found that the most effective proportion, electrolyte-to-colloid, is usually about 3:1 or 4:1; and the most effective proportion of polymeric quaternary heterocyclic compound is commonly about half the total active matter present in the finished reagent.

My reagents may contain any desirable solvent. Water is commonly found to be a highly satisfactory solvent; not only because of its ready availability and negligible cost, but also because it is an excellent solvent for the colloid and electrolyte ingredients of my reagents. Non-aqueous liquids may be incorporated into the reagents to the extent that they are compatible with the several active-matter ingredients. For example, organic preservatives of the nature of cresols may be added to prevent putrefaction or decomposition of glue, if the latter is used as an ingredient. Other preservatives, such as methyl salicylate, may be incorporated into the reagents, if required or desired. Usually, my reagents exhibit solubilities ranging from rather modest water-dispersibility to full and complete dispersibility in that solvent. Because of the small proportions used in practising my process, solubility in bulk has little significance. In the extremely low concentrations of use they undoubtedly exhibit appreciable water-dispersibility as well as some oil-solubility or oil-dispersibility.

Obviously no directions are required in regard to the use of the polymerized quaternary salts as such because one can simply use them as a dry powder added to the emulsion system, or as a concentrated aqueous solution, for instance, a 50% solution in water, or as a dilute solution having a concentration of 1% to 5%. If desired, an organic solvent can be added, such as methyl alcohol, ethylene glycol, or the like, if such addition is justified by the fact that it prevents freezing, or for some other reason not directly connected with demulsification as such.

In many instances best results are obtainable by the use of a mixed demulsifier of the kind previously described involving the addition of starch, calcium chloride, glue, or the like. Merely by way of illustration the following examples of mixed demulsifiers are included:

Demulsifier, Example 1

Mix 5 pounds of corn starch, 15 pounds of calcium chloride, 20 pounds of polymerized quaternary salt derived from vinyl pyridine, 20 pounds of animal glue, and a total 40 pounds of water. Procedure was to mix the starch and the calcium chloride, the latter in the form of a 50% aqueous solution, and hold the mixture at 90° C. for 60–70 hours. Then add the polymerized quaternary salt as mentioned above, and the glue with stirring. The mixture was an effective oil-in-water emulsifier.

Demulsifier, Example 2

Mix 3 pounds of corn starch, 10 pounds of calcium chloride, 5 pounds of zinc chloride, 5 pounds of animal glue, 20 pounds of the polymerized quaternary salt derived from vinyl pyridine, and a total of 57 pounds of water, using the calcium chloride as a 50% aqueous solution, the zinc chloride and the glue as 25% aqueous solutions. The mixture was an effective oil-in-water demulsifier.

Demulsifier, Example 3

Mix 5 pounds of animal glue, 15 pounds of calcium chloride, 30 pounds of the polymerized quaternary salt derived from vinyl pyridine, and a total of 60 pounds of water. The glue was used as a 25% aqueous solution, the calcium chloride as a 50% aqueous solution. The mixture was an effective oil-in-water demulsifier.

Demulsifier, Example 4

Mix 5 pounds of animal glue, 15 pounds of calcium chloride, 10 pounds of the polymerized quaternary salt derived from vinyl pyridine, and 10 pounds of the polymerized quaternary salt derived from 4-vinyl-5-methyl pyridine, and a total of 60 pounds of water. The glue was used as a 25% aqueous solution, and the calcium chloride as a 50% aqueous solution. The mixture was an effective oil-in-water demulsifier.

Demulsifier, Example 5

Mix 5 pounds of animal glue, 20 pounds of aluminum sulfate and 50 pounds of water. Heat the mixture until it becomes a solution. Then add with stirring 25 pounds of the polymerized quaternary salt derived from vinyl-pyridine. The mixture was an effective oil-in-water demulsifier.

The present reagents are useful, because they are able to recover the oil from oil-in-water class emulsions more advantageously and at lower cost than is possible using other reagents or other processes. In some instances, they have been found to resolve emulsions which were not economically or effectively resolvable by any other known means.

My reagents may be employed alone, or they may in some instances be employed to advantage admixed with other and compatible oil-in-water demulsifiers.

My process is commonly practised simply by introducing small proportions of my reagent into an oil-in-water-class emulsion, agitating to secure distribution of the reagent and incipient coalescence, and letting stand until the oil phase separates. The proportion of reagent required will vary with the character of the emulsion to be resolved. Ordinarily, proportions of reagent required are from 1/5,000 to 1/500,000 the volume of emulsion treated; but more is sometimes required.

I have found that the factors, reagent feed rate, agitation, and settling time are somewhat interrelated. For example, I have found that if sufficient agitation of proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the reagent into the emulsion and use the agitation produced as the latter flows through a conduit or pipe. In some cases, agitation and mixing are achieved by stirring together or shaking together the emulsion and reagent. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates, or by means of aeration cells, the effect is often importantly improved, until it constitutes a difference in kind rather than degree. A sub-aeration type flotation cell, of the kind commonly employed in ore beneficiation operations, is an extremely useful adjunct in the application of my reagents to many emulsions. It frequently accelerates the separation of the emulsion, reduces reagent requirements, or produces an improved effluent. Sometimes all three improvements are observable.

Heat is ordinarily of little importance in resolving oil-in-water-class emulsions with my reagents. Still there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

The manner of practicing the present invention is clear from the foregoing description. However, for completeness the following specific example is included. The oil-in-water-class emulsion in question was being produced from an oil well. It contained about 1,500 parts-per-million of crude oil, on the average, and was stable for days in absence of any attempt to resolve it. My process was practiced at this location by flowing the well fluids, consisting of free crude oil, oil-in-water emulsion, and natural gas, through a gas separator, then to a steel tank of 5,000-barrel capacity. In this tank, the oil-in-water emulsion fell to the bottom and was so separated from the free oil. The oil-in-water emulsion was withdrawn from the bottom of this tank, and the reagent of Demulsifier, Example 1, above, was introduced into the stream at this point. The proportion employed was about 1/40,000 the volume of emulsion, on the average. The chemicalized emulsion flowed to a second tank, mixing being achieved in the pipe. In the second tank it was allowed to stand quiescent. Clear water was withdrawn from the bottom of this tank, separated oil from the top.

As an example of the application of the aeration step in my process, the following may be recited: The emulsion was a naturally-occurring petroleum oil-in-water emulsion. It was placed in a sub-aeration flotation cell of the type commonly employed in the ore beneficiation industry. The stirring mechanism was started to begin introduction of the air, and at the same time the mixture of Demulsifier, Example 2, above, was added, the proportion of demulsifier to emulsion being 1:50,000. Samples were taken from the bottom of the machine at 1-minute intervals, to follow the progress of the resolution process. At the same time the machine was started, a sample of the same emulsion was placed in a bottle, the same proportion, 1:50,000, of the same reagent was added, the bottle was shaken 100 times, and set down beside the flotation cell. At the end of 5 minutes the water withdrawn from the bottom of the cell was brilliantly clear, whereas the bottle of treated emulsion was still quite opalescent, although some oil separation was observed. The next morning the water in the bottle was substantially as clear as that withdrawn from the cell after 5 minutes. This example illustrates the beneficial influence of the aeration technique. In most cases, it accelerates separation. In some, it permits use of smaller proportions or reagent; but in some cases, it achieves resolution, whereas, in absence of its use, satisfactory separation is not achievable in reasonable time with reasonable reagent consumption.

My reagents have likewise been successfully applied to other oil-in-water-class emulsions, of which representative examples have been referred to above. Their use is therefore not limited to crude petroleum-in-water emulsions.

Having thus described my invention, what I claim as new and desire to secure by Letters Patent, is:

1. A process for breaking emulsions composed of an oil dispersed in a non-oily continuous phase in which the dispersed phase is not greater than 20%, characterized by subjecting the emulsion to the action of a demulsifier including a hydrophile synthetic product; said hydrophile synthetic product being a polymeric quaternary ammonium salt which is a quaternized polymer, characterized by linkage of lower alkyl groups and anions to nitrogen atoms of the polymer, of a vinyl-substituted heterocyclic compound which is a member selected from the class consisting of vinyl pyridine and alkylated vinyl pyridine.

2. The process of claim 1 wherein the alkyl group has one carbon atom.

3. The process of claim 1 wherein the alkyl group is methyl.

4. The process of claim 1 in which the demulsifier includes in addition to the polymeric quaternary ammonium salt (A) a multi-polar, substantially un-ionized colloid of distributed hydrophile character; and
(B) a water soluble metallic salt, the total active matter of such demulsifier including at least 10% of each class of the above enumerated three classes of ingredients.

5. The process of claim 2 in which the demulsifier includes in adidtion to the polymeric quaternary ammonium salt
(A) a multi-polar, substantially un-ionized colloid of distributed hydrophile character; and
(B) a water soluble metallic salt, the total active matter of such demulsifier including at least 10% of each class of the above enumerated three classes of ingredients.

6. The process of claim 3 in which the demulsifier includes in addition to the polymeric quaternary ammonium salt
(A) a multi-polar, substantially un-ionized colloid of distributed hydrophile character; and
(B) a water soluble metallic salt, the total active matter of such demulsifier including at least 10% of each class of the above enumerated three classes of ingredients.

7. A proces for breaking emulsions of an oil dispersed in a non-oily continuous phase, in which the dispersed phase is not greater than 20%, characterized by subjecting the emulsion to the action of a demulsifier including a polymeric quaternary ammonium salt which is a quaternary polymer, characterized by linkage of lower alkyl groups, having not over 5 carbon atoms, and halogen atoms to nitrogen atoms of the polymer, of a vinyl-substituted heterocyclic compound selected from the class consisting of vinyl pyridine and alkylated vinyl pyridine, in which the latter alkyl group is a low molal group having not over 6 carbon atoms.

8. The process of claim 7 in which the demulsifier includes in addition to the polymeric quaternary ammonium salt
(A) a multi-polar, substantially un-ionized colloid of distributed hydrophile character; and
(B) a water soluble metallic salt, the total active matter of such demulsifier including at least 10% of each class of the above enumerated three classes of ingredients.

9. A process for breaking emulsions composed of an oil dispersed in a non-oil continuous phase in which the dispersed phase is no greater than 20%, characterized by subjecting the emulsion to the action of a demulsifier including a hydrophile synthetic product; said hydrophile synthetic product being a polymeric quaternary ammonium salt which is a quaternized polymer of a vinyl-substituted pyridine compound of the formula

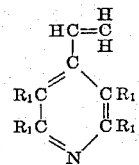

wherein $R_1$ is a member selected from the class consisting of hydrogen atoms and alkyl radicals, characterized by linkage of methyl groups and chlorine atoms to nitrogen atoms of the polymer.

10. The process of claim 9 in which the demulsifier includes in addition to the polymeric quaternary ammonium salt
(A) a multi-polar, substantially un-ionized colloid of distributed hydrophile character; and
(B) a water soluble metallic salt, the total active matter of such demulsifier including at least 10% of each class of the above enumerated three classes of ingredients.

11. A process for breaking petroleum oil-in-water emulsions in which the dispersed phase is not greater than 1%, characterized by subjecting the emulsion to the action of a demulsifier including a hydrophile synthetic product; said hydrophile synthetic product being a polymeric quaternary ammonium salt which is a quaternized polymer of a vinyl-substituted pyridine compound of the formula

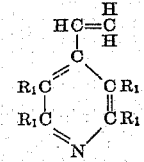

wherein $R_1$ is a member selected from the class consisting of hydrogen atoms and alkyl radicals; characterized by linkage of methyl groups and chlorine atoms to nitrogen atoms of the polymer.

12. The process of claim 11 in which the demulsifier includes in addition to the polymeric quaternary ammonium salt
(A) a multi-polar, substantially un-ionized colloid of distributed hydrophile character; and
(B) a water soluble metallic salt, the total active matter of such demulsifier including at least 10% of each class of the above enumerated three classes of ingredients.

13. A process for breaking petroleum oil-in-water emulsions in which the dispersed phase is not greater than 1%, characterized by subjecting the emulsion to the action of a demulsifier including a hydrophile synthetic product; said hydrophile synthetic product being a polymeric quaternary ammonium salt which is a quaternized polymer of a vinyl-substituted pyridine compound of the formula

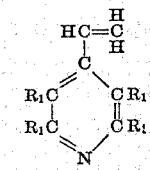

wherein $R_1$ is a member selected from the class consisting of hydrogen atoms and alkyl radicals having not over 6 carbon atoms, characterized by linkage of methyl groups and chlorine atoms to nitrogen atoms of the polymer.

14. The process as in claim 13 in which the pyridine compound is vinyl pyridine.

15. The process of claim 13 in which the demulsifier includes in addition to the polymeric quaternary ammonium salt
(A) a multi-polar, substantially un-ionized colloid of distributed hydrophile character; and
(B) a water soluble metallic salt, the total active matter of such demulsifier including at least 10% of each class of the above enumerated three classes of ingredients.

16. The process of claim 14 in which the demulsifier includes in addition to the polymeric quaternary ammonium salt
(A) a multi-polar, substantially un-ionized colloid of distributed hydrophile character; and
(B) a water soluble metallic salt, the total active matter of such demulsifier including at least 10% of each class of the above enumerated three classes of ingredients.

References Cited in the file of this patent
UNITED STATES PATENTS

| | | |
|---|---|---|
| 2,050,924 | De Groote | Aug. 11, 1936 |
| 2,159,312 | Blair | May 23, 1939 |
| 2,159,313 | Blair | May 23, 1939 |
| 2,429,996 | De Groote | Nov. 4, 1947 |
| 2,540,985 | Jackson | Feb. 6, 1951 |
| 2,595,225 | Coffman | May 6, 1952 |
| 2,643,979 | Lindert | June 30, 1953 |